(12) United States Patent
Christoffersson et al.

(10) Patent No.: US 12,574,988 B2
(45) Date of Patent: Mar. 10, 2026

(54) REPORTING MECHANISM FOR SLICE INFORMATION

(71) Applicant: Telefonaktiebolaget LM Ericsson (publ), Stockholm (SE)

(72) Inventors: Jan Christoffersson, Luleå (SE); Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 324 days.

(21) Appl. No.: 18/547,254

(22) PCT Filed: Mar. 4, 2022

(86) PCT No.: PCT/IB2022/051948
§ 371 (c)(1),
(2) Date: Aug. 21, 2023

(87) PCT Pub. No.: WO2022/185280
PCT Pub. Date: Sep. 9, 2022

(65) Prior Publication Data
US 2024/0057192 A1 Feb. 15, 2024

Related U.S. Application Data

(60) Provisional application No. 63/157,329, filed on Mar. 5, 2021.

(51) Int. Cl.
*H04W 76/19* (2018.01)
*H04W 74/0833* (2024.01)
*H04W 74/0836* (2024.01)

(52) U.S. Cl.
CPC ....... *H04W 76/19* (2018.02); *H04W 74/0833* (2013.01); *H04W 74/0836* (2024.01)

(58) Field of Classification Search
None
See application file for complete search history.

(56) References Cited

U.S. PATENT DOCUMENTS

2018/0368179 A1 12/2018 He et al.
2019/0082363 A1* 3/2019 Park ..................... H04W 24/10
(Continued)

FOREIGN PATENT DOCUMENTS

EP 3 641 433 A1 4/2020

OTHER PUBLICATIONS

International Search Report and Written Opinion dated Jun. 13, 2022 issued in PCT Application No. PCT/IB2022/051948, filed Mar. 4, 2022, consisting of 15 pages.
3GPP TSG-RAN2 #113e meeting; R2-2100424; Title: Considerations on the Solutions of Slice Based RACH Configuration; Source: Xiaomi; Agenda Item: 8.8.3; Document for: Discussion and Decision; Online, Jan. 25-Feb. 5, 2021, consisting of 5 pages.
(Continued)

*Primary Examiner* — Ayman A Abaza
*Assistant Examiner* — Camquyen Thai
(74) *Attorney, Agent, or Firm* — Weisberg I.P. Law, P.A.

(57) ABSTRACT

A method, network node, and wireless device, WD, for reporting mechanisms for slice information are described. According to one aspect, a network node configured to communicate with a WD is described. The network node includes processing circuitry configured to allocate (S148) at least one resource of a plurality of resources to at least one slice of a plurality of slices; and determine (S150), from a random access, RA, message received from the WD, the at least one slice associated with the RA message based at least in part on the at least one resource on which the RA message is received.

18 Claims, 13 Drawing Sheets

(56)                    References Cited

U.S. PATENT DOCUMENTS

| | | | |
|---|---|---|---|
| 2019/0174536 A1* | 6/2019 | Han ................... | H04W 74/0833 |
| 2019/0215761 A1 | 7/2019 | Hirata et al. | |
| 2019/0357131 A1 | 11/2019 | Sivavakeesar et al. | |
| 2022/0232448 A1* | 7/2022 | Ebrahim Rezagah ....................... | |
| | | | H04W 36/305 |
| 2023/0092324 A1* | 3/2023 | Seidel ............... | H04W 74/0833 |
| | | | 370/329 |
| 2023/0092926 A1* | 3/2023 | Fu ..................... | H04W 74/0833 |
| 2023/0319906 A1* | 10/2023 | Natarajan ............. | H04W 76/27 |
| | | | 370/329 |
| 2024/0015610 A1* | 1/2024 | Fang ................... | H04W 36/362 |

OTHER PUBLICATIONS

3GPP TR 38.832 V0.4.0 (Jan. 2021) 3rd Generation Partnership Project; Technical Specification Group RAN; NR; Study on enhancement of Radio Access Network (RAN) slicing (Release 17), consisting of 24 pages.

3GPP TS 38.300 V16.4.0 (Dec. 2020) 3rd Generation Partnership Project; Technical Specification Group Radio Access Network; NR; NR and NG-RAN Overall Description; Stage 2 (Release 16), consisting of 149 pages.

3GPP TS 38.401 V16.4.0 (Jan. 2021) 3rd Generation Partnership Project; Technical Specification Group Radio Access Network; NG-RAN; Architecture description (Release 16), consisting of 78 pages.

* cited by examiner

BEGIN

Allocate random access channel, RACH, resources to a plurality of slices or slice groups S134

Receive a random access, RA, message from the WD  S136

Identify the slice or slice group associated with the RA message based on RACH resources on which the RA message is received S138

END

BEGIN

Allocate at least one resource of a plurality of resources to at least one slice of a plurality of slices <u>S148</u>

Determine, from a random access, RA, message received from the WD, the at least one slice associated with the RA message based at least in part on the at least one resource on which the RA message is received  <u>S150</u>

END

REPORTING MECHANISM FOR SLICE INFORMATION

CROSS-REFERENCE TO RELATED APPLICATIONS

This application is a Submission Under 35 U.S.C. § 371 for U.S. National Stage Patent Application of International Application No.: PCT/IB2022/051948, filed Mar. 4, 2022 entitled "APPARATUSES AND METHODS FOR REPORTING OF NETWORK SLICE INFORMATION," which claims priority to U.S. Provisional Application No. 63/157,329, filed Mar. 5, 2021, entitled "REPORTING MECHANISM FOR SLICE INFORMATION," the entireties of both of which are incorporated herein by reference.

TECHNICAL FIELD

The present disclosure relates to wireless communications, and in particular, to reporting mechanisms for slice information.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

An example of a current 5G radio access network (RAN) architecture is described in 3GPP Technical Standard (TS) 38.401 and is depicted in FIG. 1.

The NG architecture can be further described as follows:

The NG-RAN consists of a set of network nodes such as LTE base stations (eNBs) and New Radio base stations (gNBs) connected to the 5G core (5GC) through an NG interface;

An eNB/gNB can support frequency division duplex (FDD) operation, time division duplex (TDD) operation or dual mode operation;

eNB/gNBs can be interconnected through the Xn interface;

A gNB may consist of a gNB centralized unit (CU) and one or more gNB distributed units (DUs);

A gNB-CU and a gNB-DU are connected via an F1 logical interface; and

One gNB-DU is connected to only one gNB-CU.

NG, Xn and F1 are logical interfaces. For NG-RAN, the NG and Xn-C interfaces for a gNB consisting of a gNB-CU and gNB-DUs, terminate in the gNB-CU. The gNB-CU and connected gNB-DUs are only visible to other gNBs and the 5GC as a gNB.

The NG-RAN is layered. There is a Radio Network Layer (RNL) and a Transport Network Layer (TNL). The NG-RAN architecture, which includes the NG-RAN logical nodes and the interfaces between them, is defined as part of the RNL. For each NG-RAN interface (NG, Xn, F1) the related TNL protocol and the functionality are specified. The TNL provides services for user plane transport and signaling transport.

Network Slicing in 3GPP Release 15

Network slicing involves creating logically separated partitions of the network, each partition addressing different business purposes. These "network slices" are logically separated to a degree that they can be regarded and managed as networks of their own.

This concept potentially applies to both LTE and new NR radio access technologies (RATs). A key driver for introducing network slicing is business expansion, i.e., improving the cellular operator's ability to serve other industries, e.g., by offering connectivity services with different network characteristics (performance, security, robustness, and complexity).

A working assumption is that one shared Radio Access Network (RAN) infrastructure may connect to several core network (CN) instances (with one or more Common Control Network Functions (CCNF) interfacing the radio access network (RAN), plus additional CN functions which may be slice-specific). As the CN functions are being virtualized, it is assumed that the operator may instantiate a new CN, or part of it, when a new slice should be supported. This architecture is shown in FIG. 2. Slice 0 can for example be a Mobile Broadband slice, and Slice 1 can for example be a Machine Type Communication network slice.

Network Slicing in 3GPP NR Rel 17, Agreements Related to Random Access

For 3GPP NR Release 17, a study is ongoing to investigate enhancements to network slicing. One of the objectives is to study enhancements to the random access channel (RACH) to enable fast access to a slice. Two solutions have been identified:

Solution 1 (RACH isolation): a slice-specific separate RACH resource pool can be configured per slice or per slice group, in addition to the existing common RACH resources; and Solution 2 (RACH prioritization): slice-specific RACH parameters prioritization can be configured per slice or per slice group.

In 3GPP RAN2 #113-e, RAN2 has considered and identified open issues regarding slice-based RACH configuration:

Separated PRACH configuration (e.g., transmission occasions of time-frequency domain and preambles) can be configured for slice or slice group;

Existing RACH parameters prioritization (i.e., scalingFactorBI and powerRampingStepHighPriority) can be supported as baseline for slices;

Slice group is supported. Whether to define a new grouping mechanism or reuse a unified access control (UAC) access category is left to a work item (WI) phase.

The following open issues are captured in the technical release (TR) and will be considered in WI phase:

a) For slice specific RACH, how to perform RACH type selection (e.g., 2-step & 4-step);

b) The fallback mechanism, e.g., whether to support 2 step slice-based RACH fallback to 4-step slice-based/common RACH; and c) The collision in case that slice-specific random access RA prioritization is configured together with legacy RA prioritization (e.g., multimedia priority service (MPS) & modulation and coding scheme (MCS) wireless devices (WDs)).

Solution 1 (RACH isolation) & solution 2 (RACH prioritization) can work independently in a complementary way.

Both solution 1 and solution 2 for slice-based RACH configuration are considered for normative work.

4-Step Random Access Procedure

A 4-step approach is used in 3GPP NR Release 15 for the Random Access (RA) procedure. Referring to FIG. 3, the WD detects Synchronization Signals (SS) and decodes the broadcasted system information, followed by transmitting a PRACH preamble (message 1) in the uplink. The gNB (i.e., network node) replies with a RAR (Random Access Response, message 2) which uses the RA-radio network temporary identifier (RNTI) and preamble ID for identification. The WD then transmits a WD identification (message 3) on the physical uplink shared channel (PUSCH) using an uplink grant (i.e., an allocation of uplink transmission resources).

The WD transmits message 3 (on the PUSCH) after receiving a timing advance command in the RAR, allowing the PUSCH to be received with a timing accuracy within the Cyclic Prefix (CP). Without this timing advance, a very large CP would be needed in order to be able to demodulate and detect the PUSCH, unless the system is applied in a cell with only a very small distance between WD and eNB (i.e., a network node). Since NR will also support larger cells with a need for providing a timing advance to the WD, the 4-step approach is needed for a random-access procedure.

In 3GPP NR Release 15 (Rel-15), the WD will indicate a synchronization signal block (SSB). The purpose of this is to let the gNB (i.e., network node) know which direction (i.e., which downlink (DL) beam to use) to transmit the RAR and subsequent messages. The SSB selection by the WD is done by comparing the synchronization signal reference signal received power (SS-RSRP) to the rsrp-ThresholdSSB.

Once the SSB has been selected, the indication from the WD to the gNB (i.e., network node) is done by selection of a preamble and/or a PRACH occasion (RO), depending on the configuration. With the use of specific preambles and/or RO, the WD implicitly indicates the selected SSB to the gNB (i.e., network node).

2-Step Random Access Procedure

The 2-step RA procedure was standardized in 3GPP NR Release 16. With the 2-step procedure the random access is completed in only two steps as illustrated in FIG. 4:

Step 1: The WD sends a message A (msgA) including a random-access preamble together with higher layer data such as a radio resource control (RRC) connection request possibly with some small payload on the PUSCH (denoted "msgA PUSCH"). The msgA PUSCH is used for small data transmissions in an inactive state or mode;

Step 2: The gNB (i.e., network node) sends a response called message B (msgB) (which may be described as a modified RAR) including a WD identifier assignment, timing advance information, and a contention resolution message, etc. In addition, message B may contain a higher layer part. Similar to an RAR, an msgB may contain responses to multiple msgAs, and thus to multiple WDs, but the optional higher layer part can only pertain to one of the responses (i.e., to one of the msgAs/WDs). If a response in a msgB does not have an associated higher layer part, this will be sent in a separate subsequent message, e.g., an RRC message, on the physical downlink shared channel (PDSCH). MsgB is identified by an MsgB-RNTI.

The msgA contains a preamble transmission and a PUSCH transmission where the preamble is mapped to the PUSCH. This means that when a particular preamble is selected, the preamble implies which time and frequency and demodulation reference signal (DMRS) sequence that is used for the PUSCH transmission The msgB is a response to msgA, which may contain contention resolution message(s), fallback indication(s) to schedule Msg3 transmission, and back off indication.

The msgB is a response to msgA, which may contain responses to multiple WDs and with different kinds of information for different WDs depending on the outcome of the msgA transmission/reception (and the load on the access resources).

Upon a successful msgA reception, the gNB includes a successRAR medium access control (MAC) subPDU as a response for the concerned WD, where the successRAR MAC subPDU includes a contention resolution identity, a timing advance and a C-RNTI allocation.

If the gNB (i.e., network node) successfully received the RACH preamble, but failed to receive the msgA PUSCH, the gNB can respond to the concerned WD with a fallback-RAR MAC subPDU in the msgB. The fallbackRAR essentially turns the 2-step RA into a 4-step RA and consequently the fallbackRAR MAC subPDU contains an UL grant, a timing advance and a temporary C-RNTI (TC-RNTI) allocation, but no contention resolution identity. The WD uses the UL grant to retransmit msgA PUSCH in the form of Msg3.

In addition to successRAR and fallbackRAR MAC subPDUs, the gNB may include a parameter which is intended for the WDs that did not find any response to their respective msgA transmissions in msgB. This parameter is the Backoff Indicator (a single parameter for all WDs which did not find their expected response in the msgB), which controls whether and how much a WD must wait until it can attempt to access the network through random access again.

Radio Link Failure

As described in clause 9.2.7 of 3GPP Technical Standard (TS) 38.300 v. 16.4.0, in RRC_CONNECTED state, the WD performs Radio Link Monitoring (RLM) in the active bandwidth part (BWP) based on reference signals (synchronization signal block (SSB)/channel state information reference signal (CSI-RS)) and signal quality thresholds configured by the network. SSB-based RLM is based on the SSB associated to the initial downlink (DL) BWP and can only be configured for the initial DL BWP and for DL BWPs containing the SSB associated to the initial DL BWP. For other DL BWPs, RLM can only be performed based on the CSI-RS. In case of dual active protocol stack (DAPS) handover, the WD continues the RLM at the source cell until the successful completion of the random-access procedure to the target cell.

The WD declares Radio Link Failure (RLF) when at least one of the following criteria is met:

Expiry of a radio problem timer started after indication of a radio problem from the physical layer (if radio problems are recovered before the timer is expired, the WD stops the timer);

Expiry of a timer started upon triggering a measurement report for a measurement identity for which the timer has been configured while another radio problem timer is running;

Random access procedure failure;

RLC failure;

Detection of consistent uplink LBT failures for operation with shared spectrum channel access as described in 5.6.1 of 3GPP TS 38.300 v 16.4.0; or For IAB-MT, the reception of BH RLF indication received from its parent node.

After RLF is declared, the WD:

stays in RRC_CONNECTED;

in case of DAPS handover, for RLF in the source cell:

stops any data transmission or reception via the source link and releases the source link, but maintains the source RRC configuration; and/or if handover failure is then declared at the target cell, the WD:

selects a suitable cell and then initiates RRC re-establishment; and/or enters RRC_IDLE if a suitable cell was not found within a certain time after handover failure was declared.

in case of CHO, for RLF in the source cell:

selects a suitable cell and if the selected cell is a CHO candidate and if network configured the WD to try CHO after RLF then the WD attempts CHO execution once, otherwise re-establishment is performed; and/or enters RRC_IDLE if a suitable cell was not found within a certain time after RLF was declared;

otherwise, for RLF in the serving cell or in case of DAPS handover, for RLF in the target cell before releasing the source cell:

selects a suitable cell and then initiates RRC re-establishment; and/or enters RRC_IDLE if a suitable cell was not found within a certain time after RLF was declared.

When RLF occurs at the integrated access and backhaul (IAB) link, the same mechanisms and procedures are applied as for the access link. This includes BH RLF detection and RLF recovery.

In cases where the RRC reestablishment procedure fails, the IAB-node may transmit a backhaul (BH) RLF indication to its child nodes. The BH RLF indication is transmitted as backhaul adaptation protocol (BAP) Control packet data unit (PDU).

As an example of a radio link monitoring procedure is illustrated in FIG. 5.

As described in 3GPP TR 38.832 v0.4.0, the relevant scenarios and solutions regarding slice-based RACH configuration are as follows:

Example intentions and use cases are as follows:

Intention 1: RACH resource isolation. From a marketing point of view, some of the industrial customers have the requirement for access resource isolation, in order to provide guaranteed RA resources for their sensitive slices;

Intention 2: Slice access prioritization. In 3GPP Releases 15 and 16, all slices share the same RA resources and cannot be differentiated by the network. But some slices may need to be prioritized during the RA procedure.

The following solution approaches are being considered:

Solution 1: A slice-specific separate RACH resources pool can be configured per slice or per slice group, in addition to the existing common RACH resources.

Solution 2: A slice-specific RACH parameters prioritization can be configured per slice or per slice group.

Thus, slice-based RACH configurations will be studied and supported in 3GPP NR Rel-17. Among the possible solutions, solution 2 will be considered. In RAN2 #113-e, for solution 2, RAN2 has considered reusing the existing RACH parameter prioritization (i.e., scalingFactorBI and powerRampingStepHighPriority) which has been designed in 3GPP NR Rel-15 as a baseline. However, typical network nodes are unable to identify whether a received RA procedure is initiated on a specific slice.

SUMMARY

Some embodiments advantageously provide methods, network nodes and wireless devices for reporting mechanisms for slice information.

In some embodiments, a network node (e.g., gNB) may be configured to determine/identify whether a received RA procedure is initiated on a specific slice. Prioritized RA procedures on specific slices may share the same RA resources as other non-prioritized RA procedures. When a network node identifies RA procedures on specific slices, the network node may further treat transmissions and/or receptions towards the specific slices differently. Such identification may be beneficial at least in cases where there are one or more failures observed by a WD on specific slices.

In some other embodiments, where a WD has triggered a RA procedure on a slice or a slice group, the WD first determines whether there are specific RACH resources allocated to the slice or the slice group. The WD may take different actions depending on the determination.

In one embodiment, when there are specific RACH resources allocated to the slice or slice group, the WD may use those RACH resources to transmit the RA messages to the network node. Upon reception of the RA messages, the network node may identify the slice or the slice group associated with the RA messages based on the used RA resources. In this case, there is no additional report needed from the WD indicating the information on the slice or the slice group.

In another embodiment, when there are no specific RACH resources allocated to the slice or slice group, in order to transmit the RA messages, the WD may use the RACH resources which are shared with RA procedures on other slices or other slice groups. The WD may apply at least one of the following example options to report the slice/slice group information to the network node.

Option 1: one or multiple fields in a MAC subheader to indicate the slice/slice group information;

Option 2: use a medium access control (MAC) control element (CE) to indicate the slice/slice group information;

Option 3: use radio resource control (RRC) signaling to indicate the slice/slice group information. In case failures have occurred in a slice/slice group, the WD may report the slice/slice group information associated with the failure:

RRC re-establishment in a suitable cell upon declaration of radio link failure (RLF) in a primary cell; in this case, the WD indicates the slice/slice group information associated with the RLF in the RRC re-establishment request message.

MCGFailureInformationl

SCGFailureInformation;

The BH RLF indication is transmitted as a BAP Control PDU; in the control PDU, the WD indicates the slice/slice group information associated with the failure; and/or An RLF report.

When the network node identifies the RA procedures on specific slices, the network node can further treat transmissions and receptions towards the specific slices differently. Such identification is also beneficial in case failures are observed by a WD on specific slices.

According to one aspect, a network node configured to communicate with a wireless device (WD) is described. The network node includes processing circuitry configured to allocate at least one resource of a plurality of resources to at least one slice of a plurality of slices; and determine, from a random access (RA) message received from the WD, the at least one slice associated with the RA message based at least in part on the at least one resource on which the RA message is received.

In some embodiments, the processing circuitry is further configured to: when at least a first resource of the plurality of resources is allocated to a first slice of the plurality of slices, cause the network node to receive the RA message from the WD on the allocated at least first resource; and when the at least first resource is not allocated to the first slice, cause the network node to receive the RA message from the WD using at least a second resource of the plurality of resources. The at least second resource is shared by the first slice with at least a second slice of the plurality of slices.

In some other embodiments, the processing circuitry is further configured to cause the network node to receive a radio link failure (RLF) report, the RLF report including slice information associated with the RLF.

In one embodiment, the RLF is based at least in part on a reference signal associated with the at least one slice of the plurality of slices.

In another embodiment, the processing circuitry is further configured to, when the RLF is detected on a primary cell link, cause the network node to receive an indication of slice information associated with the RLF in a reestablishment request message.

In some embodiments, the processing circuitry is further configured to, when the RLF is detected on a cell group, cause the network node to receive another indication of slice information associated with the RLF in the cell group, the cell group being one of a master cell group (MCG) and a secondary cell group (SCG).

In some other embodiments, the plurality of resources includes random access channel (RACH) resources.

In an embodiment, at least one of: the at least one slice includes at least one slice group; the first slice includes the at least a first slice group; the second slice includes at least a second slice group; the first slice is associated with a first RA procedure; and the second slice is associated with a second RA procedure.

In another embodiment, the processing circuitry is further configured to cause the network node to transmit a request to the WD to report slice group information.

In some embodiments, at least one of: slice information includes at least one of a slice identifier and a slice group identifier; and the slice information is reported using at least one of radio resource control (RRC) signaling and medium access control (MAC) signaling.

According to another aspect, a method implemented in a network node configured to communicate with a wireless device (WD) is described. The method includes allocating at least one resource of a plurality of resources to at least one slice of a plurality of slices; and determining, from a random access (RA) message received from the WD, the at least one slice associated with the RA message based at least in part on the at least one resource on which the RA message is received.

In some embodiments, the method further includes: when at least a first resource of the plurality of resources is allocated to a first slice of the plurality of slices, receiving the RA message from the WD on the allocated at least first resource; and when the at least first resource is not allocated to the first slice, receiving the RA message from the WD using at least a second resource of the plurality of resources. The at least second resource is shared by the first slice with at least a second slice of the plurality of slices.

In some other embodiments, the method further includes receiving a radio link failure (RLF) report, where the RLF report includes slice information associated with the RLF.

In one embodiment, the RLF is based at least in part on a reference signal associated with the at least one slice of the plurality of slices.

In another embodiment, the method further includes, when the RLF is detected on a primary cell link, receiving an indication of slice information associated with the RLF in a reestablishment request message.

In some embodiments, the method further includes, when the RLF is detected on a cell group, receiving another indication of slice information associated with the RLF in the cell group. The cell group is one of a master cell group (MCG) and a secondary cell group (SCG).

In one embodiment, the plurality of resources are random access channel (RACH) resources.

In another embodiment, at least one of: the at least one slice includes at least one slice group; the first slice includes the at least a first slice group; the second slice includes at least a second slice group; the first slice is associated with a first RA procedure; and the second slice is associated with a second RA procedure.

In some embodiments, the method further includes transmitting a request to the WD to report slice group information.

In some other embodiments, at least one of: slice information includes at least one of a slice identifier and a slice group identifier; and the slice information is reported using at least one of radio resource control (RRC) signaling and medium access control (MAC) signaling.

According to one aspect, a wireless device WD configured to communicate with a network node is described. The WD includes processing circuitry configured to determine whether at least one resource of a plurality of resources is allocated to at least one slice of a plurality of slices; and cause the WD to report slice information of the at least one slice to the network node based at least on the determination.

In some embodiments, the determining includes at least one of: when at least a first resource of the plurality of resources is allocated to a first slice of the plurality of slices, cause the WD to transmit a random access (RA) message to the network node on the allocated at least first resource; and when the at least first resource is not allocated to the first slice, cause the WD to transmit the RA message to the network node using at least a second resource of the plurality of resources. The at least second resource is shared by the first slice with at least a second slice of the plurality of slices. At least one slice includes at least one of the first slice and the second slice, and the second slice is different from the first slice.

In some other embodiments, the processing circuitry is further configured to cause the WD to transmit a radio link failure (RLF) report, where the RLF report includes the slice information associated with the RLF.

In one embodiment, the RLF is based at least in part on a reference signal associated with the at least one slice of the plurality of slices.

In another embodiment, the processing circuitry is further configured to, when the RLF is detected on a primary cell link: reestablish a communication link on secondary cell; and cause the WD to transmit an indication of slice information associated with the RLF in a reestablishment request message.

In some embodiments, the processing circuitry is further configured to, when the RLF is detected on a cell group, cause the WD to transmit another indication of slice information associated with the RLF in the cell group, the cell group being one of a master cell group (MCG) and a secondary cell group (SCG).

In some other embodiments, the plurality of resources includes random access channel (RACH) resources.

In one embodiment, at least one of: the at least one slice includes at least one slice group; the first slice includes the at least a first slice group; the second slice includes at least a second slice group; the first slice is associated with a first RA procedure; and the second slice is associated with a second RA procedure.

In another embodiment, the processing circuitry is further configured to cause the WD to receive a request from the network node to report slice group information.

In some embodiments, at least one of: the slice information includes at least one of a slice identifier and a slice group identifier; and the slice information is reported using at least one of radio resource control (RRC) signaling and medium access control (MAC) signaling.

According to another aspect, a method implemented in a wireless device (WD) configured to communicate with a network node is described. The method includes determining whether at least one resource of a plurality of resources is allocated to at least one slice of a plurality of slices; and reporting slice information of the at least one slice to the network node based at least on the determination.

In some embodiments, the determining includes at least one of: when at least a first resource of the plurality of resources is allocated to a first slice of the plurality of slices, transmitting a random access (RA) message to the network node on the allocated at least first resource; and when the at least first resource is not allocated to the first slice, transmitting the RA message to the network node using at least a second resource of the plurality of resources. The at least second resource is shared by the first slice with at least a second slice of the plurality of slices. At least one slice includes at least one of the first slice and the second slice. The second slice is different from the first slice.

In some other embodiments, the method further includes transmitting a radio link failure (RLF) report, where the RLF report includes the slice information associated with the RLF.

In one embodiment, the RLF is based at least in part on a reference signal associated with the at least one slice of the plurality of slices.

In some embodiments, the method further includes, when the RLF is detected on a primary cell link: reestablishing a communication link on secondary cell; and transmitting an indication of slice information associated with the RLF in a reestablishment request message.

In some other embodiments, the method further includes, when the RLF is detected on a cell group transmitting another indication of slice information associated with the RLF in the cell group, where the cell group is one of a master cell group (MCG) and a secondary cell group (SCG).

In one embodiment, the plurality of resources is random access channel, RACH, resources.

In another embodiment, at least one of: the at least one slice includes at least one slice group; the first slice includes the at least a first slice group; the second slice includes at least a second slice group; the first slice is associated with a first RA procedure; and the second slice is associated with a second RA procedure.

In some embodiments, the method further includes receiving a request from the network node to report slice group information.

In some other embodiments, wherein at least one of: the slice information includes at least one of a slice identifier and a slice group identifier; and the slice information is reported using at least one of radio resource control (RRC) signaling and medium access control (MAC) signaling.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
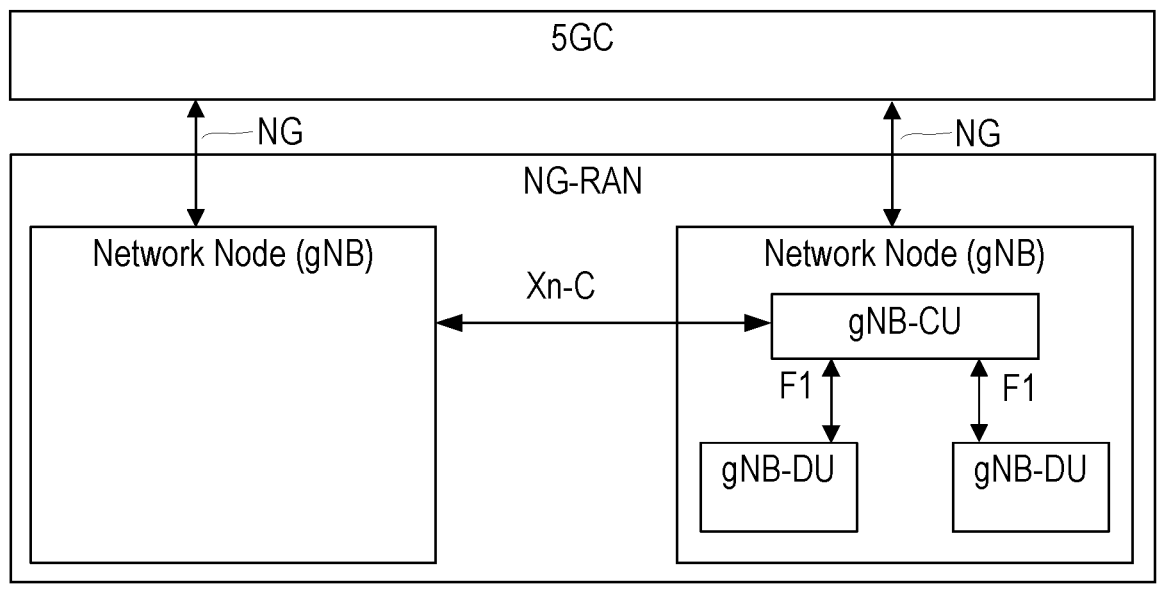
FIG. 1 is a diagram of a 5G architecture.
Figure 2:
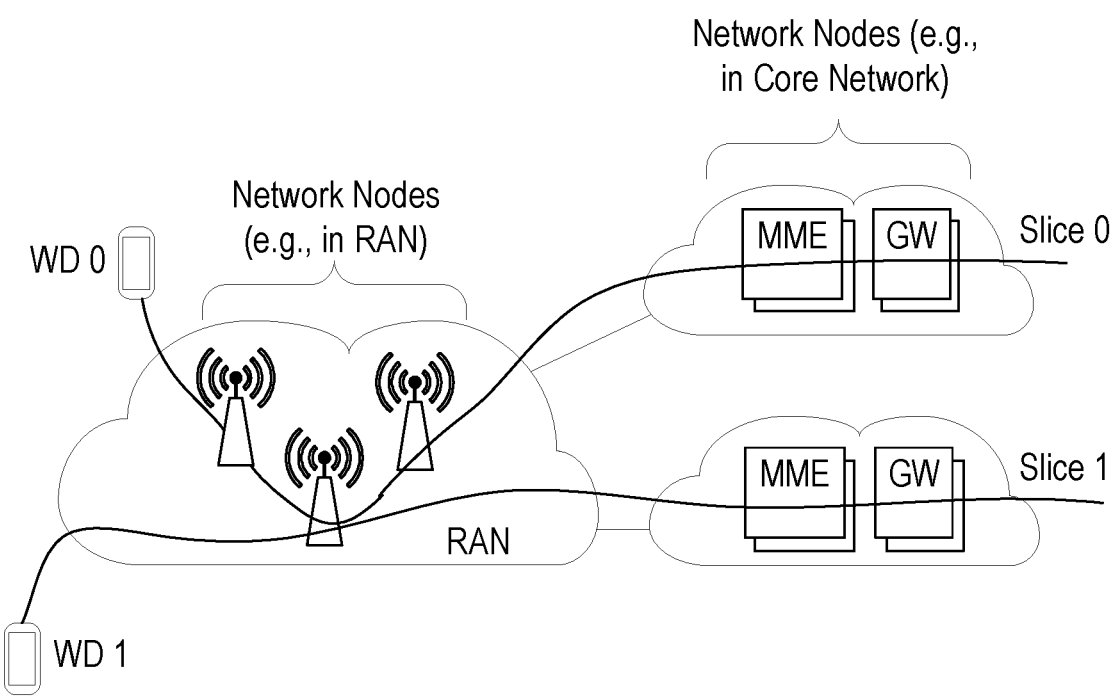
FIG. 2 is a diagram of an architecture partitioning a network into slices.
Figure 3:
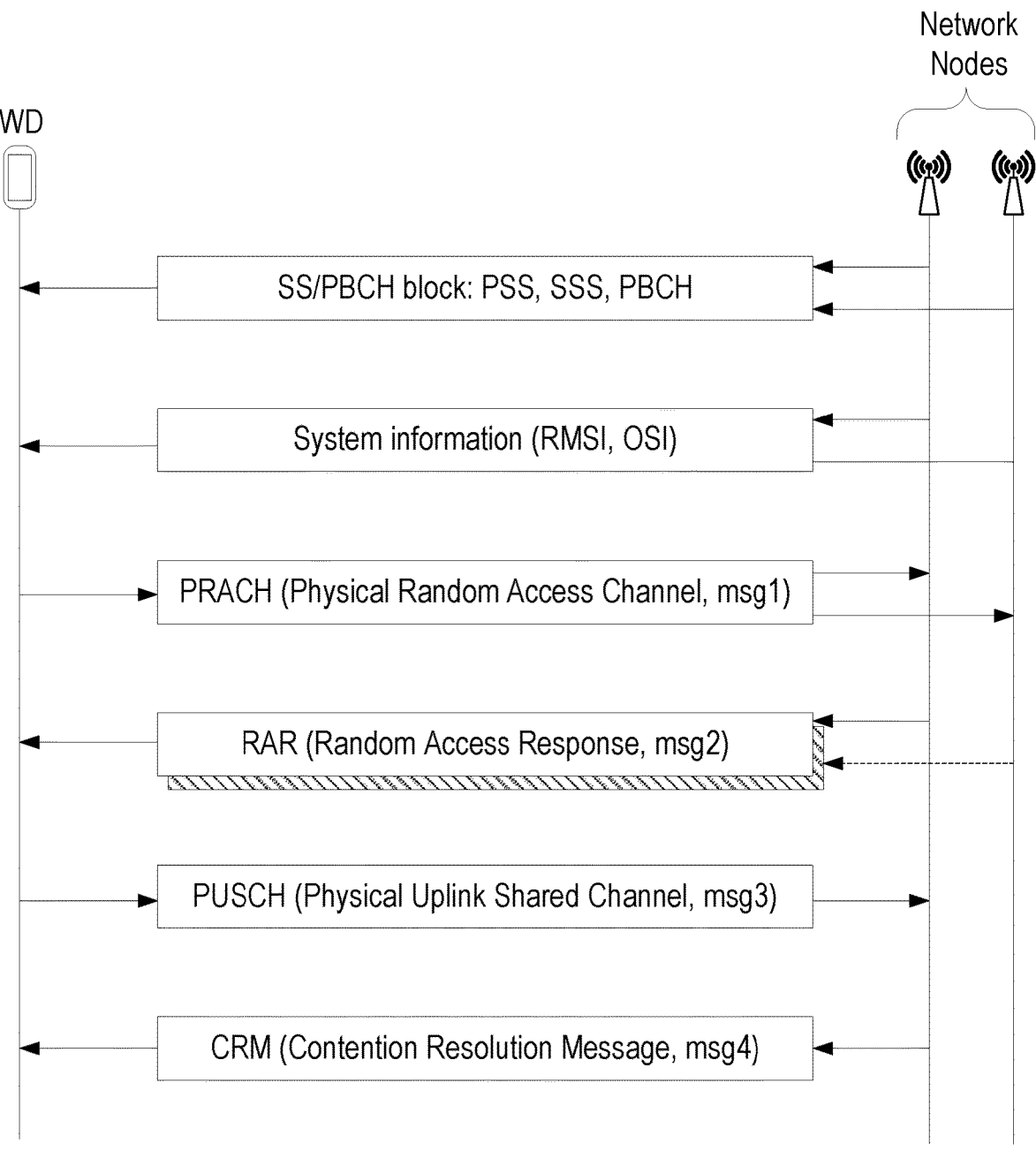
FIG. 3 is a diagram of a 4-step random access procedure.
Figure 4:
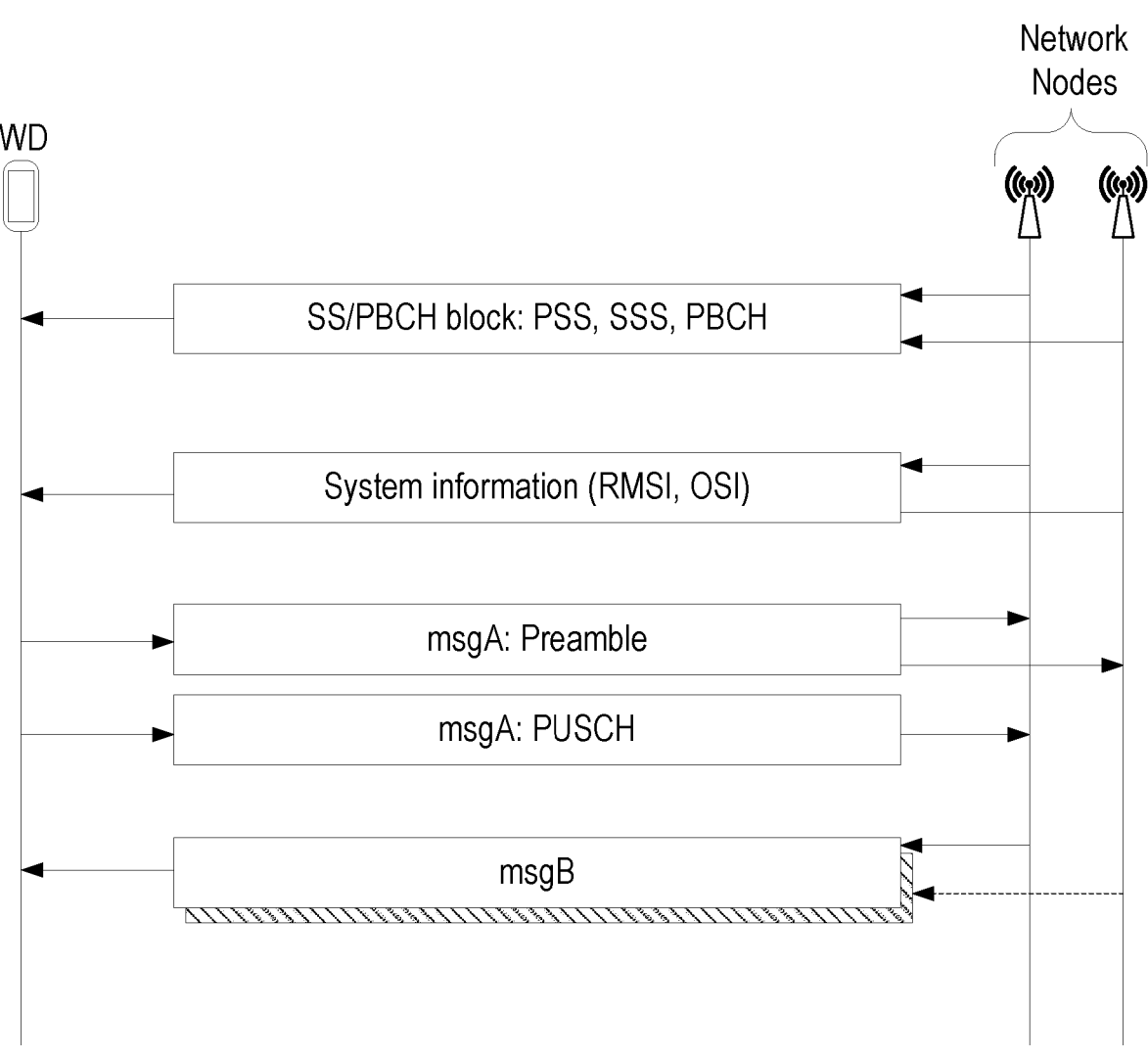
FIG. 4 is a diagram of a 2-step random access procedure.
Figure 5:
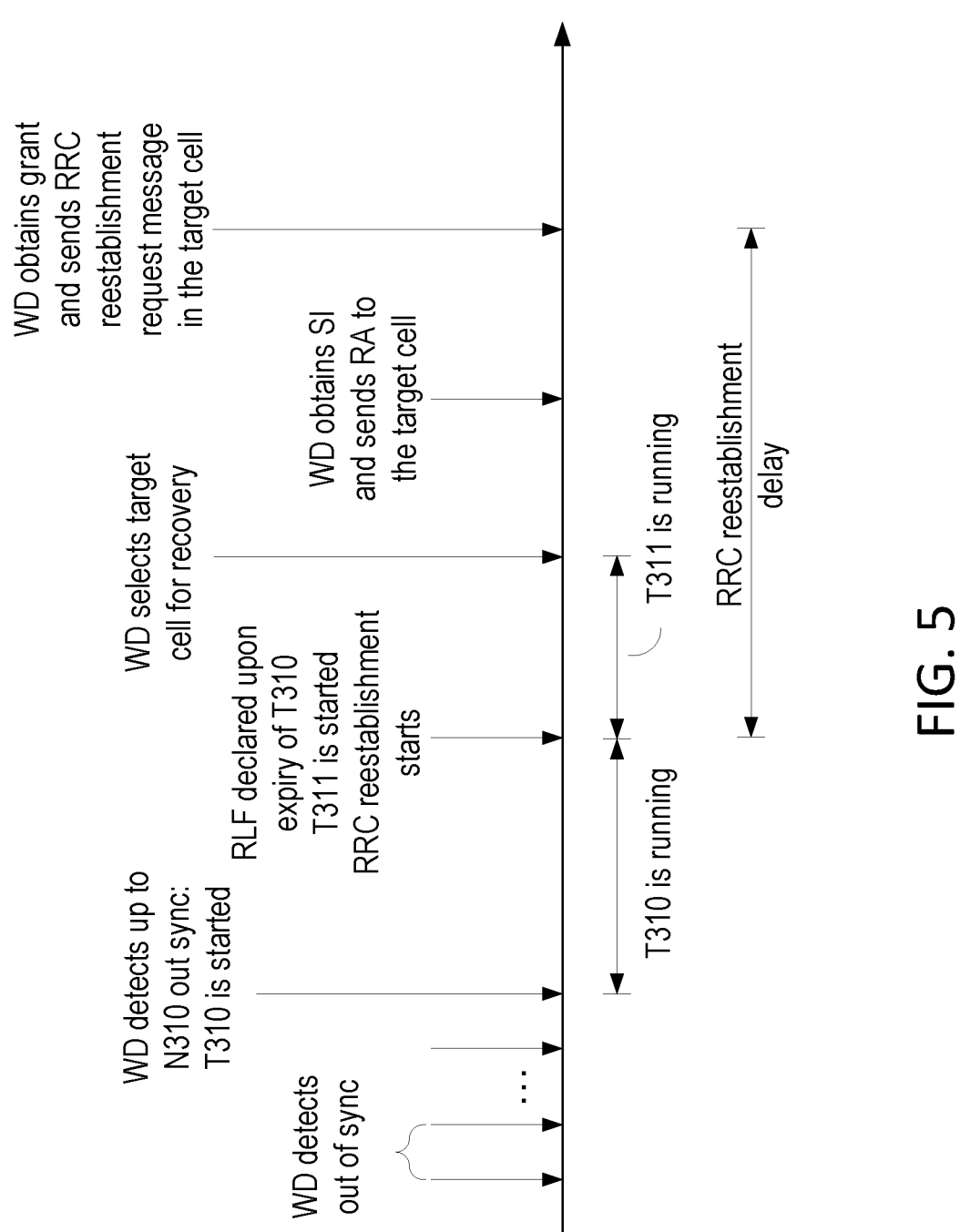
FIG. 5 is a timing diagram for a RA procedure.

Before describing in detail example embodiments, it is noted that the embodiments reside primarily in combinations of apparatus components and processing steps related to reporting mechanisms for slice information. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., $3^{rd}$ party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

The term "slice information" means information that indicates the Slice ID and/or the Slice group ID. Slice information may also refer to the DRB(s) associated with the Slice ID and/or Slice group ID. Further, slice information may be the Slice ID number and/or Slice group ID number and/or an indication which may be mapped to this (i.e., Slice ID number and/or Slice group ID number). Slice information may also refer to the traffic type, service, and/or application mapped to the slice and/or the slice group.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide reporting mechanisms for slice information. According to one aspect, a method in a WD includes allocating random access channel (RACH) resources to a plurality of slices or slice groups, receiving a random access (RA) message from the WD, and identifying the slice or slice group associated with the RA message based on RACH resources on which the RA message is received.

Figure 6:
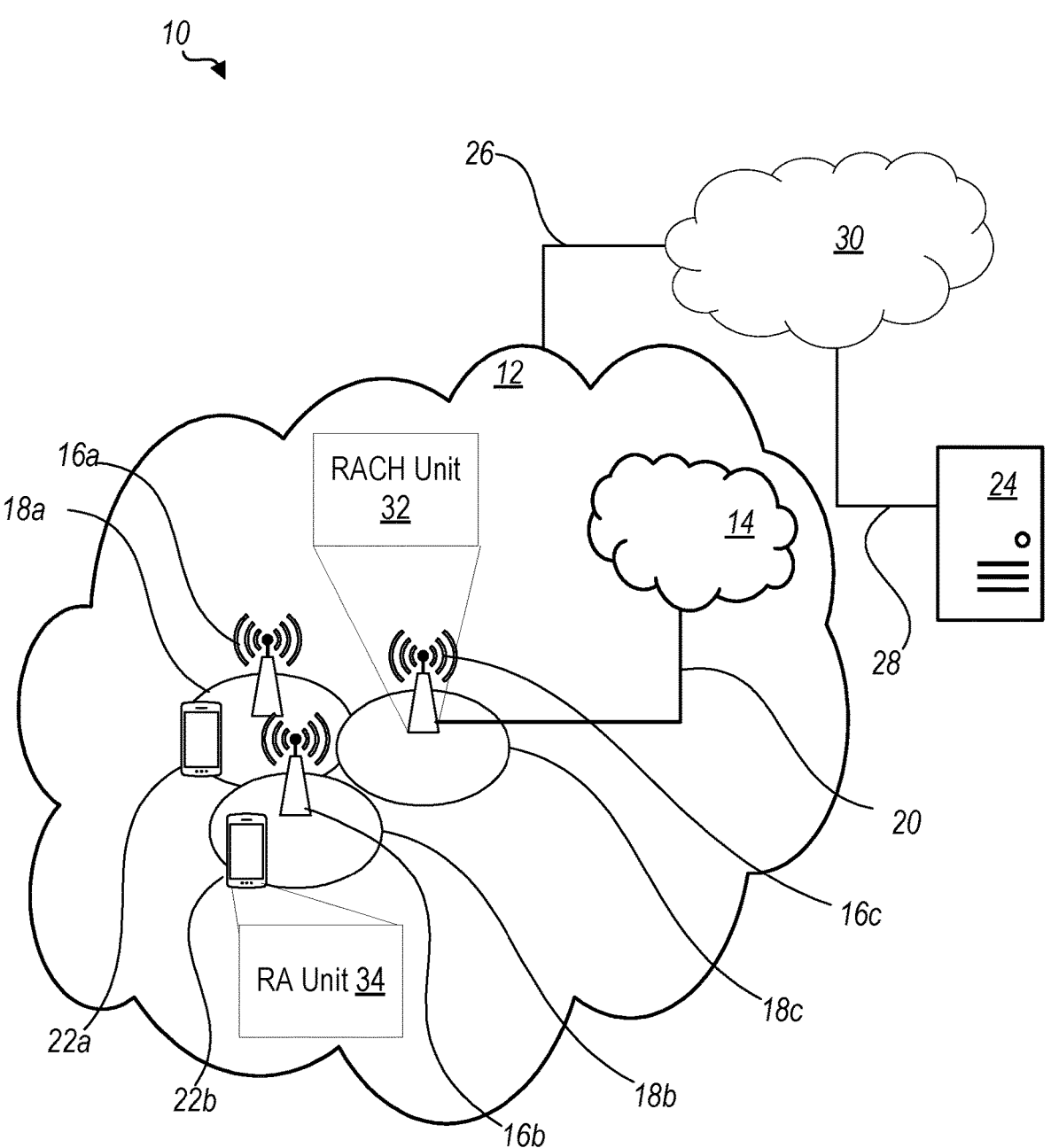
FIG. 6 is a schematic diagram of an example network architecture illustrating a communication system connected via an intermediate network to a host computer according to the principles in the present disclosure.

Returning now to the drawing figures, in which like elements are referred to by like reference numerals, there is shown in FIG. 6 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 6 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a RACH unit 32 which is configured to allocate random access channel, RACH, resources to a plurality of slices or slice groups. A wireless device 22 is configured to include an RA unit 34 which is configured to report slice information for the one of the first and second slice used to transmit the RA message.

Example implementations, in accordance with an embodiment, of the WD 22, network node 16 and host computer 24 discussed in the preceding paragraphs will now be described with reference to FIG. 7. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include RACH unit 32 which is configured to allocate random access channel, RACH, resources to a plurality of slices or slice groups.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include RA unit 34 which is configured to report slice information for the one of the first and second slice used to transmit the RA message In some embodiments, the inner workings of the network node 16, WD 22, and host computer 24 may be as shown in FIG. 7 and independently, the surrounding network topology may be that of FIG. 6.

Figure 7:
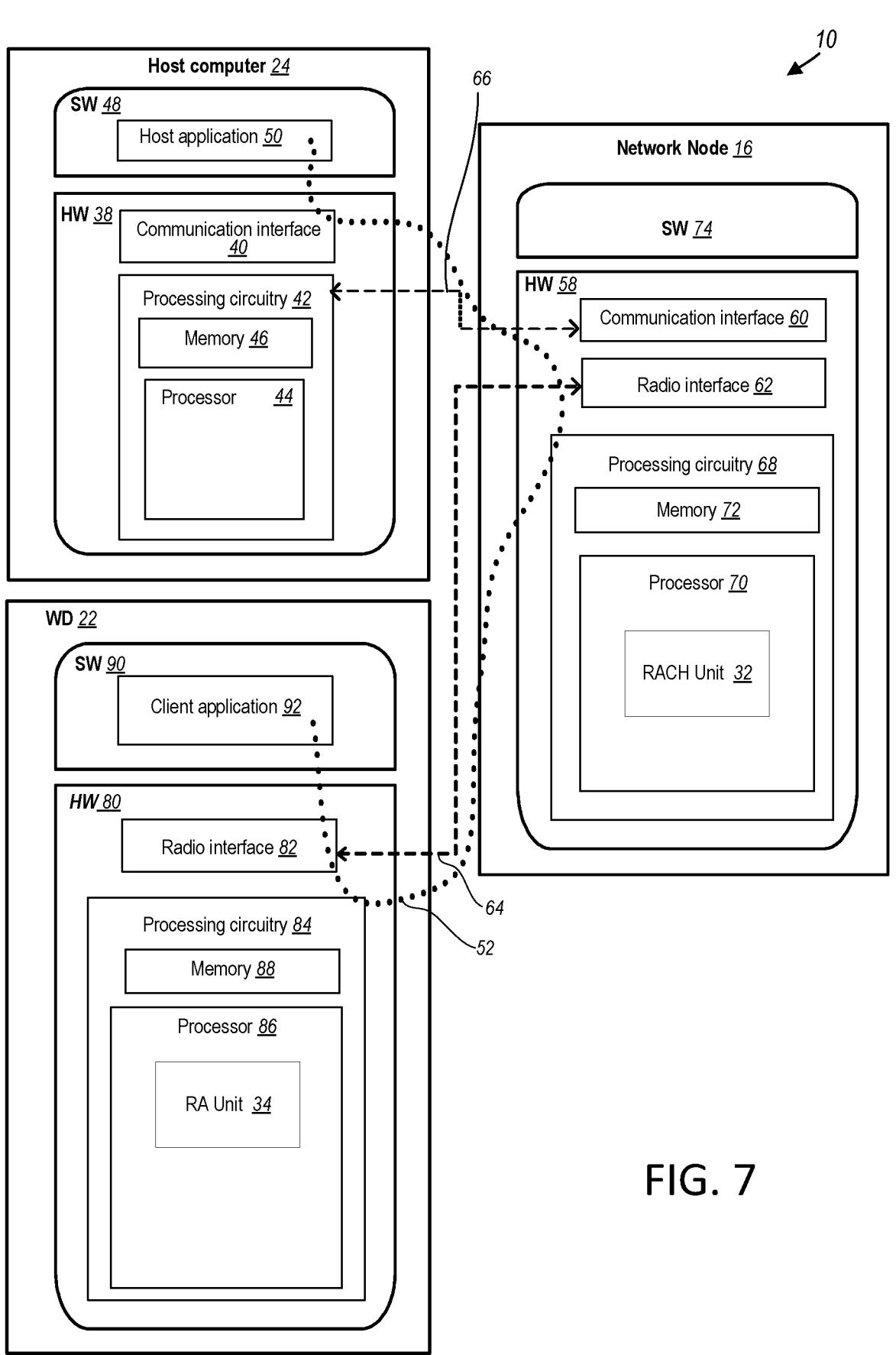
FIG. 7 is a block diagram of a host computer communicating via a network node with a wireless device over an at least partially wireless connection according to some embodiments of the present disclosure.

In FIG. 7, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 6 and 7 show various "units" such as RACH unit 32, and RA unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 8, 9:
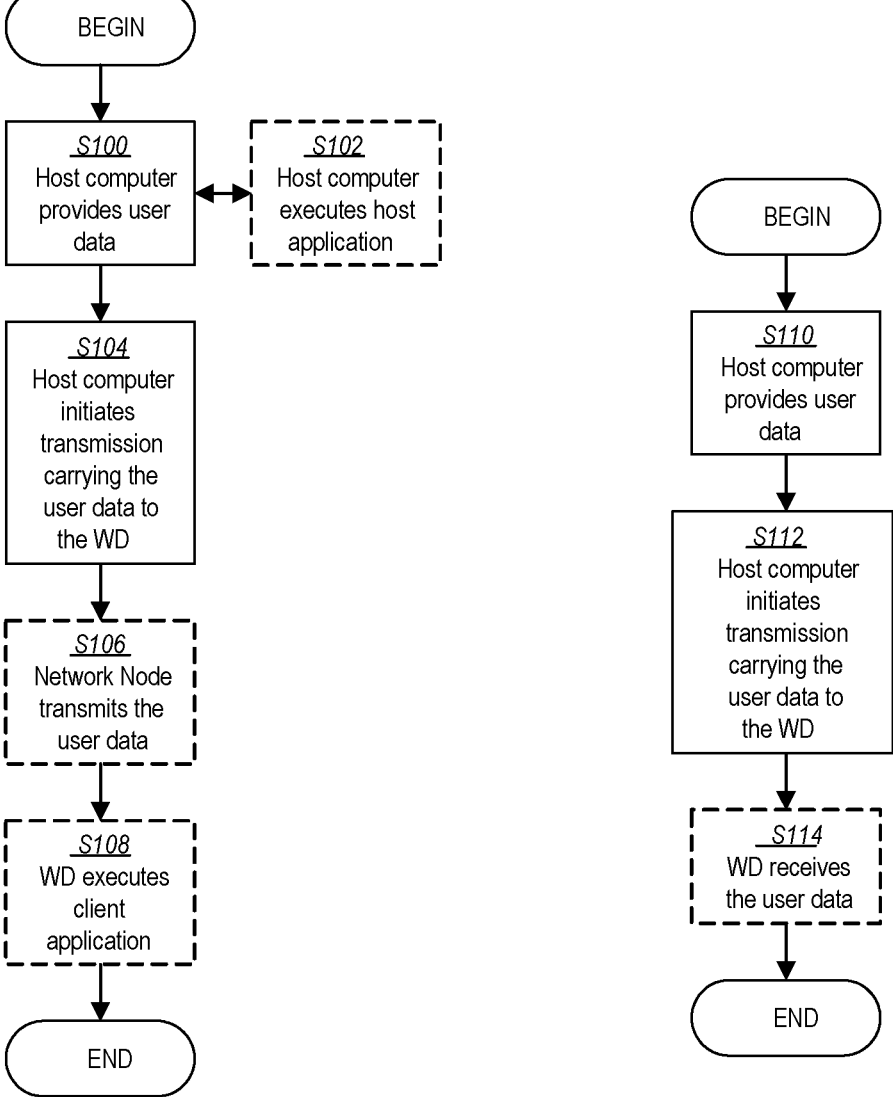
FIG. 8 is a flowchart illustrating example methods implemented in a communication system including a host computer, a network node and a wireless device for executing a client application at a wireless device according to some embodiments of the present disclosure.
FIG. 9 is a flowchart illustrating example methods implemented in a communication system including a host computer, a network node and a wireless device for receiving user data at a wireless device according to some embodiments of the present disclosure.

FIG. 8 is a flowchart illustrating an example method implemented in a communication system, such as, for example, the communication system of FIGS. 6 and 7, in accordance with one embodiment. The communication system may include a host computer 24, a network node 16 and a WD 22, which may be those described with reference to FIG. 7. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 9 is a flowchart illustrating an example method implemented in a communication system, such as, for example, the communication system of FIG. 6, in accordance with one embodiment. The communication system may include a host computer 24, a network node 16 and a WD 22, which may be those described with reference to FIGS. 6 and 7. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 10:
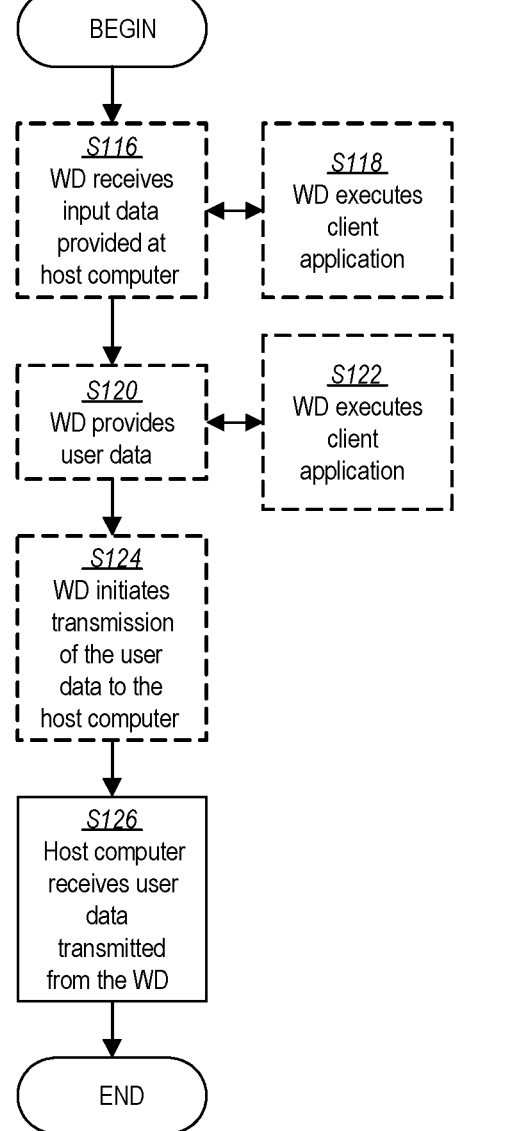
FIG. 10 is a flowchart illustrating example methods implemented in a communication system including a host computer, a network node and a wireless device for receiving user data from the wireless device at a host computer according to some embodiments of the present disclosure.

FIG. 10 is a flowchart illustrating an example method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 11:
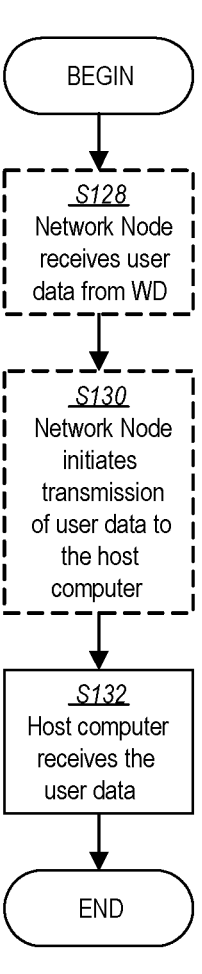
FIG. 11 is a flowchart illustrating example methods implemented in a communication system including a host computer, a network node and a wireless device for receiving user data at a host computer according to some embodiments of the present disclosure.

FIG. 11 is a flowchart illustrating an example method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 12:
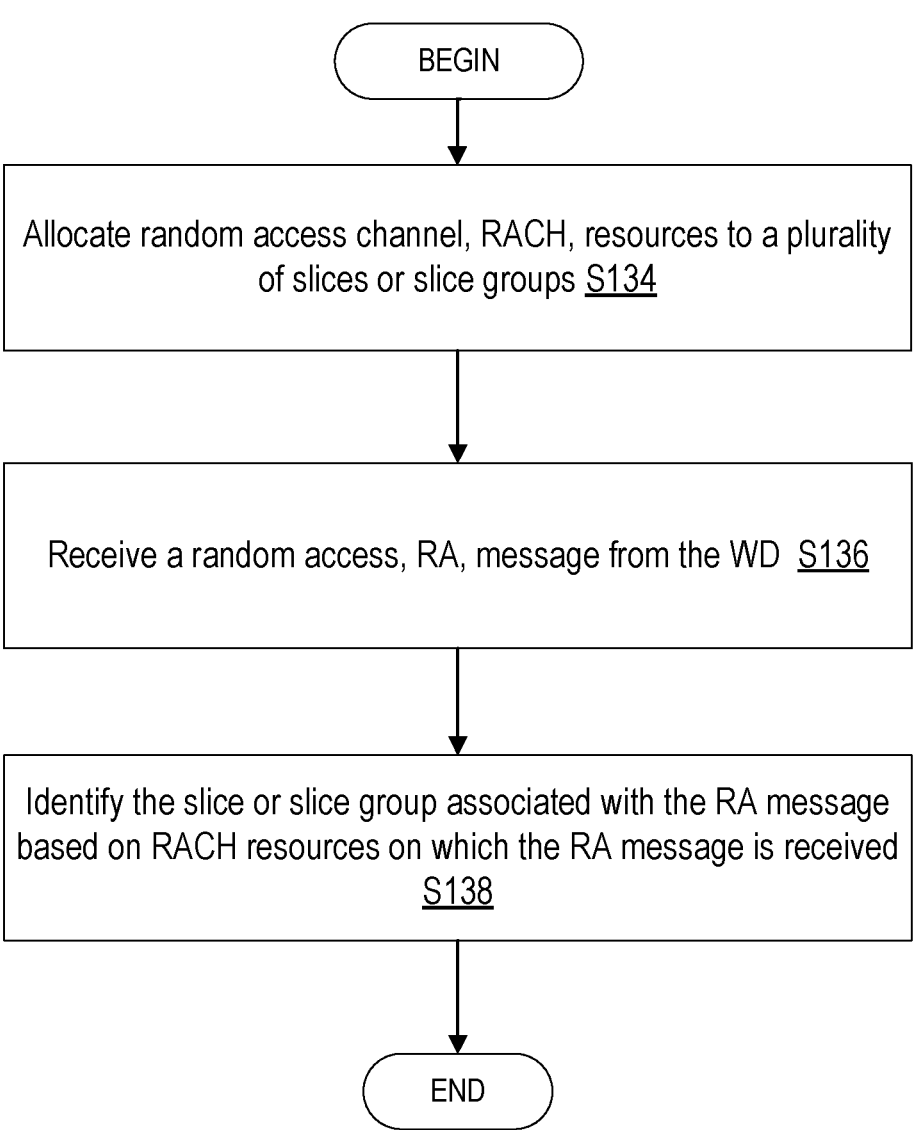
FIG. 12 is a flowchart of an example process in a network node according to some embodiments of the present disclosure.

FIG. 12 is a flowchart of an example process (i.e., method) in a network node 16 according to some embodiments. One or more blocks described herein may be performed by one or more elements of network node 16 such as by one or more of processing circuitry 68 (including the RACH unit 32), processor 70, radio interface 62 and/or communication interface 60. Network node 16 such as via processing circuitry 68 and/or processor 70 and/or radio interface 62 and/or communication interface 60 is configured to allocate random access channel (RACH) resources to a plurality of slices or slice groups (Block S134). The process also includes receiving a random access (RA) message from the WD (Block S136). The process further includes identifying the slice or slice group associated with the RA message based on RACH resources on which the RA message is received (Block S138).

In some embodiments, the method further includes requesting the WD 22 to report slice or slice group information associated with a RACH procedure on the identified slice or slice group.

In some other embodiments, the method further includes receiving a radio link failure (RLF) report from the WD 22, where the RLF report includes slice or slice group information associated with the RLF.

Figure 13:
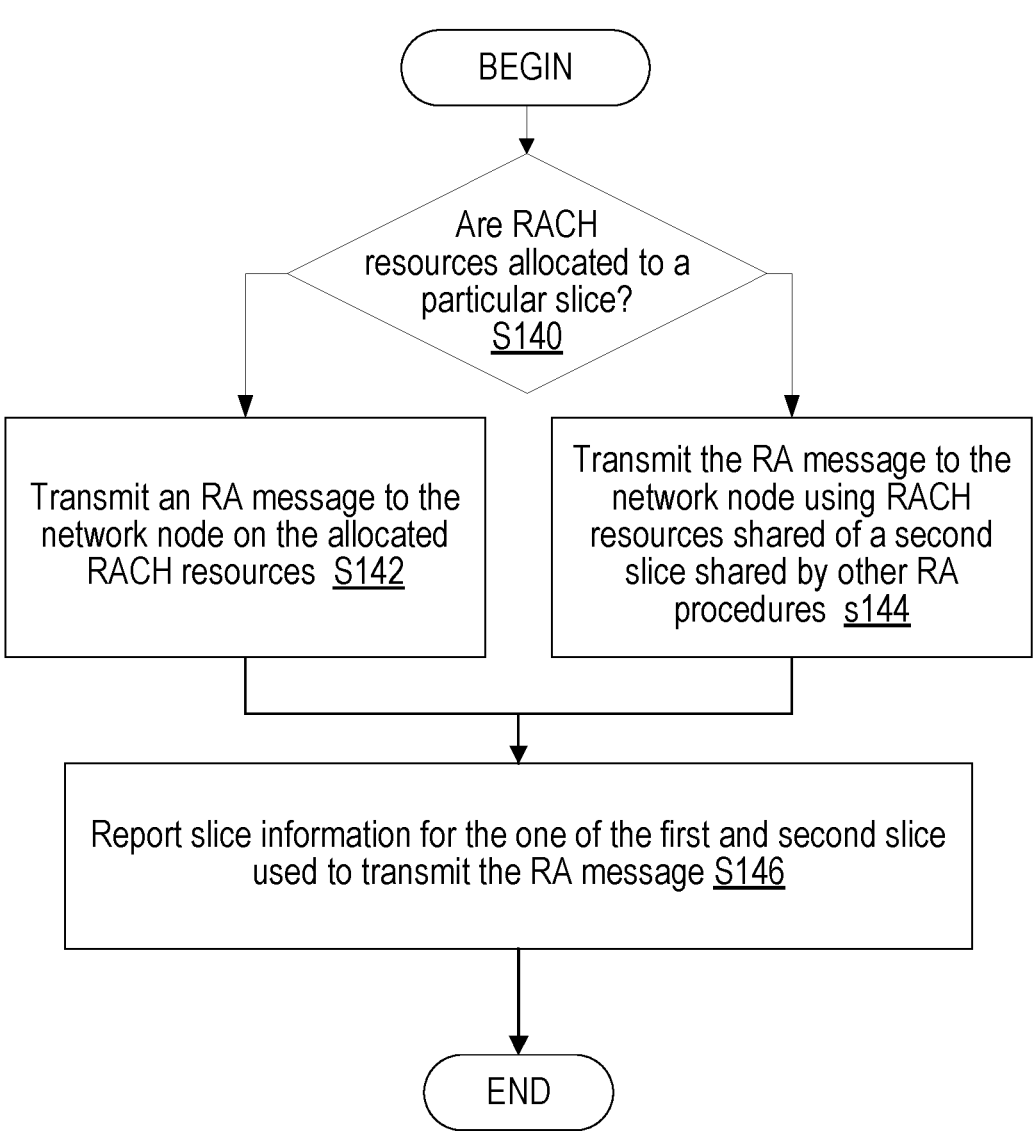
FIG. 13 is a flowchart of an example process in a wireless device for according to some embodiments of the present disclosure.

FIG. 13 is a flowchart of an example process in a wireless device 22 according to some embodiments of the present disclosure. One or more blocks described herein may be performed by one or more elements of wireless device 22 such as by one or more of processing circuitry 84 (including the RA unit 34), processor 86, radio interface 82 and/or communication interface 60. Wireless device 22 such as via processing circuitry 84 and/or processor 86 and/or radio interface 82 is configured to determine whether random access channel, RACH, resources are allocated to a particular slice (Block S140). The process includes, when RACH resources are allocated to a first slice, transmitting a random access, RA, message to the network node on the allocated RACH resources (Block S142). The process includes, when no RACH resources are allocated to the first slice, transmit the RA message to the network node using RACH resources shared of a second slice shared by other RA procedures (Block S144). The process also includes reporting slice information for the one of the first and second slice used to transmit the RA message (Block S146).

In some embodiments, the slice information is reported on one of radio resource control (RRC) signaling and medium access control (MAC) signaling.

In some other embodiments, the method further includes transmitting a radio link failure (RLF) report from the WD 22, where the RLF report includes slice information associated with the RLF.

In one embodiment, the RLF is based on a reference signal on the slice.

In another embodiment, the method further includes, when a RLF is detected on a primary cell link, reestablishing a link on secondary cell.

In some embodiments, the method further includes, when a RLF is detected on a master cell group (MCG), performing a MCG recovery procedure.

Figure 14:
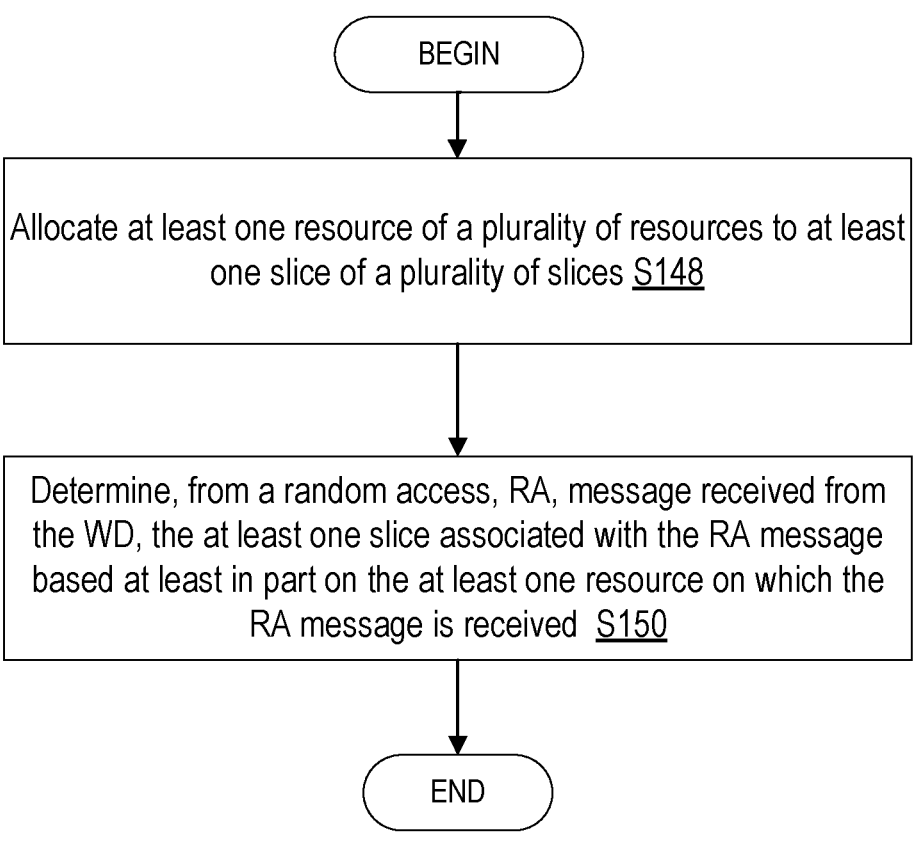
FIG. 14 is a flowchart of an example process in a network node according to some embodiments of the present disclosure.

FIG. 14 is a flowchart of another example process (i.e., method) in a network node 16 according to some embodiments. One or more blocks described herein may be performed by one or more elements of network node 16 such as by one or more of processing circuitry 68 (including the RACH unit 32), processor 70, radio interface 62 and/or communication interface 60. Network node 16 such as via processing circuitry 68 and/or processor 70 and/or radio interface 62 and/or communication interface 60 is configured to allocate at least one resource of a plurality of resources to at least one slice of a plurality of slices (Block S148) and determine, from a random access (RA) message received from the WD 22, the at least one slice associated with the RA message based at least in part on the at least one resource on which the RA message is received (Block S150).

In some embodiments, the method further includes: when at least a first resource of the plurality of resources is allocated to a first slice of the plurality of slices, receiving the RA message from the WD 22 on the allocated at least first resource; and when the at least first resource is not allocated to the first slice, receiving the RA message from the WD 22 using at least a second resource of the plurality of resources. The at least second resource is shared by the first slice with at least a second slice of the plurality of slices.

In some other embodiments, the method further includes receiving a radio link failure (RLF) report, where the RLF report includes slice information associated with the RLF.

In one embodiment, the RLF is based at least in part on a reference signal associated with the at least one slice of the plurality of slices.

In another embodiment, the method further includes, when the RLF is detected on a primary cell link, receiving an indication of slice information associated with the RLF in a reestablishment request message.

In some embodiments, the method further includes, when the RLF is detected on a cell group, receiving another indication of slice information associated with the RLF in the cell group. The cell group is one of a master cell group (MCG) and a secondary cell group (SCG).

In one embodiment, the plurality of resources are random access channel (RACH) resources.

In another embodiment, at least one of: the at least one slice includes at least one slice group; the first slice includes the at least a first slice group; the second slice includes at least a second slice group; the first slice is associated with a first RA procedure; and the second slice is associated with a second RA procedure.

In some embodiments, the method further includes transmitting a request to the WD 22 to report slice group information.

In some other embodiments, at least one of: slice information includes at least one of a slice identifier and a slice group identifier; and the slice information is reported using at least one of radio resource control (RRC) signaling and medium access control (MAC) signaling.

Figure 15:
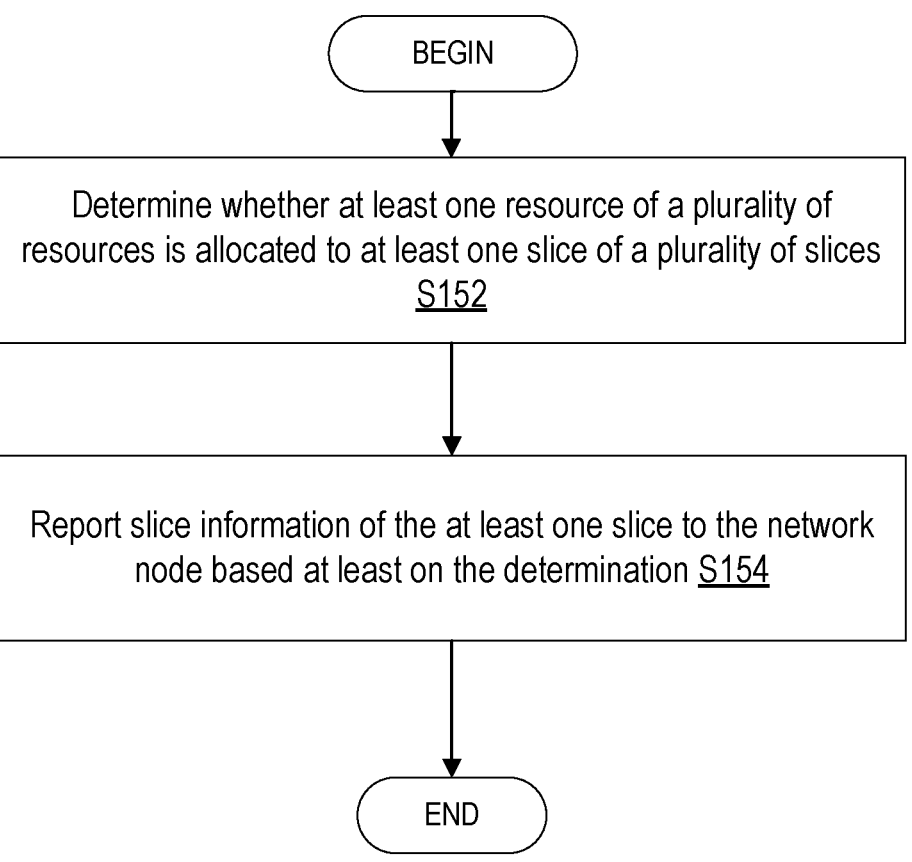
FIG. 15 is a flowchart of an example process in a wireless device according to some embodiments of the present disclosure.

FIG. 15 is a flowchart of an example process in a WD 22 according to some embodiments. One or more blocks described herein may be performed by one or more elements of WD 22 such as by one or more of processing circuitry 84 (including the RA unit 34), processor 86, and/or radio interface 82. WD 22 such as via processing circuitry 84 and/or processor 86 and/or radio interface 82 is configured to determine whether at least one resource of a plurality of resources is allocated to at least one slice of a plurality of slices (Block S152) and report slice information of the at least one slice to the network node based at least on the determination (Block S154).

In some embodiments, the determining includes at least one of: when at least a first resource of the plurality of resources is allocated to a first slice of the plurality of slices, transmitting a random access (RA) message to the network node 16 on the allocated at least first resource; and when the at least first resource is not allocated to the first slice, transmitting the RA message to the network node 16 using at least a second resource of the plurality of resources. The at least second resource is shared by the first slice with at least a second slice of the plurality of slices. At least one slice includes at least one of the first slice and the second slice. The second slice is different from the first slice.

In some other embodiments, the method further includes transmitting a radio link failure (RLF) report, where the RLF report includes the slice information associated with the RLF.

In one embodiment, the RLF is based at least in part on a reference signal associated with the at least one slice of the plurality of slices.

In some embodiments, the method further includes, when the RLF is detected on a primary cell link: reestablishing a communication link on secondary cell; and transmitting an indication of slice information associated with the RLF in a reestablishment request message.

In some other embodiments, the method further includes, when the RLF is detected on a cell group transmitting another indication of slice information associated with the RLF in the cell group, where the cell group is one of a master cell group (MCG) and a secondary cell group (SCG).

In one embodiment, the plurality of resources is random access channel, RACH, resources.

In another embodiment, at least one of: the at least one slice includes at least one slice group; the first slice includes the at least a first slice group; the second slice includes at least a second slice group; the first slice is associated with a first RA procedure; and the second slice is associated with a second RA procedure.

In some embodiments, the method further includes receiving a request from the network node 16 to report slice group information.

In some other embodiments, wherein at least one of: the slice information includes at least one of a slice identifier and a slice group identifier; and the slice information is reported using at least one of radio resource control (RRC) signaling and medium access control (MAC) signaling.

Having described the general process flow of arrangements of the disclosure and having provided examples of hardware and software arrangements for implementing the processes and functions of the disclosure, the sections below provide details and examples of arrangements for reporting mechanisms for slice information.

Report of Slice Information in Normal Cases

In cases where a WD 22 has triggered an RA procedure on a slice or a slice group, the WD 22 may first determine if there are specific RACH resources allocated to the slice or the slice group. The WD 22 takes different actions depending on the determination. When there are specific RACH resources allocated to the slice or slice group, the WD 22 may use those RACH resources to transmit the RA messages to the network node 16. Upon reception of the RA messages, the network node 16 may identify the slice or the slice group associated with the RA messages based on the used RA resources. In this case, there is no additional report needed from the WD 22 indicating the information on the slice or the slice group.

When there are no specific RACH resources allocated to the slice or slice group, in order to transmit the RA messages, the WD 22 may use the RACH resources which are shared with RA procedures on other slices or other slice groups. The WD 22 may apply at least one of the following example options to report the slice/slice group information to the network node 16.

Option 1: one or multiple fields in a MAC subheader to indicate the slice/slice group information: The WD 22 may repurpose and reuse existing fields or introduce new fields for indicating the slice/slice group information. The existing R fields (used alone or used together with other fields) may be applied;

Option 2: MAC CE to indicate the slice/slice group information: The WD 22 may repurpose and reuse existing MAC CE for indicating the slice/slice group information. Alternatively, a new MAC CE may be defined (e.g., slice ID MAC CE or slice group ID MAC CE) for indicating the slice/slice group information; and/or Option 3: RRC signaling to indicate the slice/slice group information: The WD 22 sends RRC signaling to the network node 16 for reporting the slice/slice group information. A new RRC information element (IE) carrying the slice/slice group information may be defined accordingly.

The RRC signaling could, for example, be any one or more of the following:

RRC setup request;

RRC resume request;

UEInformationResponse; and/or

Measurement report.

The WD 22 may apply at least one of the above options when transmitting one of the RA messages to the network node 16. For any one of the above options, the corresponding fields/messages will be included in the RA message sent to the network node 16. Upon reception of the RA message, the network node 16 will be aware of the slice/slice group information associated with the RA procedure.

In some embodiments, the network node 16 may request the WD 22 to provide a RACH report for a slice/slice group. The WD 22 may then indicate the slice/slice group information associated with the RACH procedures on the slice/slice group.

Report of Slice Information in Failure Cases

As captured in clause 9.2.7 of the 3GPP TS 38.300 v 16.4.0, the WD 22 declares Radio Link Failure (RLF) when at least one of the following criteria is met:

Expiry of a radio problem timer started after indication of radio problems from the physical layer (if radio problems are recovered before the timer is expired, the WD 22 stops the timer);

Expiry of a timer started upon triggering a measurement report for a measurement identity for which the timer has been configured while another radio problem timer is running;

Random access procedure failure;

RLC failure;

Detection of consistent uplink listen before talk (LBT) failures for operation with shared spectrum channel access as described in 5.6.1 of TS 38.300 v 16.4.0; and/or For IAB-MT, the reception of a BH RLF indication received from its parent node.

In some embodiments, any one of the above criteria may be met in a slice, meaning that the relevant trigger reference signals, and/or transmission activities, and/or reception activities may be measured for that slice.

In some embodiments, the WD 22 initiates RRC re-establishment in a suitable cell upon declaration of RLF in a primary cell. In this case, the WD 22 may indicate the slice/slice group information associated with the RLF in the RRC re-establishment request message. In some embodiments, the WD 22 informs the network about a master cell group (MCG) failure the WD 22 has experienced, i.e., an MCG radio link failure. A WD 22 in RRC_CONNECTED state, for which access stratum (AS) security has been activated with signaling radio bearer 2 (SRB2) and at least one dedicated radio bearer (DRB) setup or, for IAB, the SRB2, may initiate the fast MCG link recovery procedure in order to continue the RRC connection without re-establishment. In the signaling MCGFailureInformation, the WD 22 may indicate the slice/slice group information associated with the RLF in MCG.

In some embodiments, the WD 22 informs the network about a secondary cell group (SCG) failure the WD 22 has experienced, i.e., SCG radio link failure, failure of SCG reconfiguration with synchronization, SCG configuration failure for RRC message on SRB3, SCG integrity check failure, and consistent uplink LBT failures on a PSCell for operation with shared spectrum channel access. In the signaling SCGFailureInformation IE, the WD 22 may indicate the slice/slice group information associated with the failure.

In some embodiments, when RLF occurs at the IAB BH link, the same mechanisms and procedures are applied as for the access link. This includes BH RLF detection and RLF recovery.

In case the RRC reestablishment procedure fails, the IAB-node may transmit a BH RLF indication to its child nodes. The BH RLF indication may be transmitted as a BAP Control PDU. In the control PDU, the WD 22 may indicate the slice/slice group information associated with the failure.

In some embodiments, the network may request the WD 22 to provide RLF report and the WD 22 may indicate the slice/slice group information associated with the RLF in the RLF report According to one aspect, a network node 16 is configured to communicate with a wireless device, WD 22. The network node 16 includes a radio interface 62 and/or processing circuitry 68 configured to allocate random access channel, RACH, resources to a plurality of slices or slice groups; receive a random access, RA, message from the WD 22; and identify the slice or slice group associated with the RA message based on RACH resources on which the RA message is received.

According to this aspect, in some embodiments, the network node 16, radio interface 62 and/or processing circuitry 68 is further configured to request the WD 22 to report slice or slice group information associated with a RACH procedure on the identified slice or slice group. In some embodiments, the network node 16, radio interface 62 and/or processing circuitry 68 is further configured to receive a radio link failure, RLF, report from the WD 22, the RLF report including slice or slice group information associated with the RLF.

According to another aspect, a method implemented in a network node 16 includes allocating random access channel, RACH, resources to a plurality of slices or slice groups; receiving a random access, RA, message from the WD 22; and identifying the slice or slice group associated with the RA message based on RACH resources on which the RA message is received.

According to this aspect, in some embodiments, the method also includes requesting the WD 22 to report slice or slice group information associated with a RACH procedure on the identified slice or slice group. In some embodiments, the method also includes receiving a radio link failure, RLF, report from the WD 22, the RLF report including slice or slice group information associated with the RLF.

According to yet another aspect, a WD 22 is configured to communicate with a network node 16. The WD 22 includes a radio interface 82 and/or processing circuitry 84 configured to: determine whether random access channel, RACH, resources are allocated to a particular slice. When RACH resources are allocated to a first slice, the WD 22 transmits a random access, RA, message to the network node 16 on the allocated RACH resources. When no RACH resources are allocated to the first slice, the WD 22 transmits the RA message to the network node 16 using RACH resources shared of a second slice shared by other RA procedures. The WD 22 also reports slice information for the one of the first and second slice used to transmit the RA message.

According to this aspect, in some embodiments, the slice information is reported on one of radio resource control, RRC, signaling and medium access control, MAC, signaling. In some embodiments, the WD 22, radio interface 82 and/or processing circuitry 84 are further configured to transmit a radio link failure, RLF, report from the WD 22, the RLF report including slice information associated with the RLF. In some embodiments, the RLF is based on a reference signal on the slice. In some embodiments, when a RLF is detected on a primary cell link, the WD 22, radio interface 82 and/or processing circuitry 84 are configured to reestablish a link on secondary cell. In some embodiments, when a RLF is detected on a master cell group, MCG, the WD 22, radio interface and/or processing circuitry are configured to perform an MCG recovery procedure.

According to another aspect, a method implemented in a WD 22, includes determining whether random access channel, RACH, resources are allocated to a particular slice. When RACH resources are allocated to a first slice, the method includes transmitting a random access, RA, message to the network node 16 on the allocated RACH resources; and when no RACH resources are allocated to the first slice, the method includes transmitting the RA message to the network node 16 using RACH resources shared of a second slice shared by other RA procedures. The method also includes reporting slice information for the one of the first and second slice used to transmit the RA message.

According to this aspect, in some embodiments, the slice information is reported on one of radio resource control, RRC, signaling and medium access control, MAC, signaling. In some embodiments, the method also includes transmitting a radio link failure, RLF, report from the WD 22, the RLF report including slice information associated with the RLF. In some embodiments, the RLF is based on a reference signal on the slice. In some embodiments, the method also includes, when a RLF is detected on a primary cell link, reestablishing a link on secondary cell. In some embodiments, the method also includes when a RLF is detected on a master cell group, MCG, performing an MCG recovery procedure.

Network Actions, e.g., Upon Reception of Slice Information

Network node 16 (e.g., gNB) may be configured to determine load and/or congestion and/or resource status for one or more slices, e.g., one or more slices and/or slice groups. Network node 16 may be configured to perform, without being limited to, at least one of the following actions, e.g., upon reception of a report of slice information:

Provide reconfiguration to WD 22 for concerned slices and/or slice groups;

Move a predetermined WD 22 and/or a predetermined service of a WD 22 from one slice and/or slice group to another slice and/or slice group capable of providing more resources and/or better Quality of Service (QoS) satisfaction;

Move a WD 22 from a bandwidth part (BWP), cell, carrier, and/or frequency band to another BWP, cell, carrier, and/or frequency band, respectively;

De-configure and/or deactivate a slice and/or slice group for a WD 22

Add a slice and/or slice group to a WD 22 for better QoS satisfaction; and

A signaling message regarding slice info may be exchanged between network nodes 16, e.g., such as gNBs, Access and Mobility Functions (AMFs), and/or Service Management Functions (SMFs).

The following is a list of nonlimiting example embodiments:

Embodiment A1. A network node configured to communicate with a wireless device, WD, the network node configured to, and/or comprising a radio interface and/or comprising processing circuitry configured to:

allocate random access channel, RACH, resources to a plurality of slices or slice groups;

receive a random access, RA, message from the WD; and identify the slice or slice group associated with the RA message based on RACH resources on which the RA message is received.

Embodiment A2. The network node of Embodiment A1, wherein the network node, radio interface and/or processing circuitry is further configured to request the WD to report slice or slice group information associated with a RACH procedure on the identified slice or slice group.

Embodiment A3. The network node of Embodiment A1, wherein the network node, radio interface and/or processing circuitry is further configured to receive a radio link failure, RLF, report from the WD, the RLF report including slice or slice group information associated with the RLF.

Embodiment B1. A method implemented in a network node, the method comprising:

allocating random access channel, RACH, resources to a plurality of slices or slice groups;

receiving a random access, RA, message from the WD; and identifying the slice or slice group associated with the RA message based on RACH resources on which the RA message is received.

Embodiment B2. The method of Embodiment B1, further comprising requesting the WD to report slice or slice group information associated with a RACH procedure on the identified slice or slice group.

Embodiment B3. The method of Embodiment B1, further comprising receiving a radio link failure, RLF, report from the WD, the RLF report including slice or slice group information associated with the RLF.

Embodiment C1. A wireless device WD configured to communicate with a network node, the WD configured to, and/or comprising a radio interface and/or processing circuitry configured to:

determine whether random access channel, RACH, resources are allocated to a particular slice; and when RACH resources are allocated to a first slice, transmit a random access, RA, message to the network node on the allocated RACH resources; and when no RACH resources are allocated to the first slice, transmit the RA message to the network node using RACH resources shared of a second slice shared by other RA procedures; and report slice information for the one of the first and second slice used to transmit the RA message.

Embodiment C2. The WD of Embodiment C1, wherein the slice information is reported on one of radio resource control, RRC, signaling and medium access control, MAC, signaling.

Embodiment C3. The WD of Embodiment C1, wherein the WD, radio interface and/or processing circuitry are further configured to transmit a radio link failure, RLF, report from the WD, the RLF report including slice information associated with the RLF.

Embodiment C4. The WD of Embodiment C3, wherein the RLF is based on a reference signal on the slice.

Embodiment C5. The WD of Embodiment C3, wherein, when a RLF is detected on a primary cell link, the WD, radio interface and/or processing circuitry are configured to reestablish a link on secondary cell.

Embodiment C6. The WD of Embodiment C3, wherein, when a RLF is detected on a master cell group, MCG, the WD, radio interface and/or processing circuitry are configured to perform an MCG recovery procedure.

Embodiment D1. A method implemented in a wireless device (WD), the method comprising:

determining whether random access channel, RACH, resources are allocated to a particular slice; and when RACH resources are allocated to a first slice, transmitting a random access, RA, message to the network node on the allocated RACH resources; and when no RACH resources are allocated to the first slice, transmitting the RA message to the network node using RACH resources shared of a second slice shared by other RA procedures; and reporting slice information for the one of the first and second slice used to transmit the RA message.

Embodiment D2. The method of Embodiment D1, wherein the slice information is reported on one of radio resource control, RRC, signaling and medium access control, MAC, signaling.

Embodiment D3. The method of Embodiment D1, further comprising transmitting a radio link failure, RLF, report from the WD, the RLF report including slice information associated with the RLF.

Embodiment D4. The method of Embodiment D3, wherein the RLF is based on a reference signal on the slice.

Embodiment D5. The method of Embodiment D3, further comprising, when a RLF is detected on a primary cell link, reestablishing a link on secondary cell.

Embodiment D6. The method of Embodiment D3, further comprising, when a RLF is detected on a master cell group, MCG, performing an MCG recovery procedure.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware.

Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings.

It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

AMF Access and Mobility Management Function
C-RNTI Cell-RNTI
CBRA Contention Based RA
CFRA Contention Free RA
CU Centralized Unit
CP Cyclic Prefix
DMRS Demodulation Reference Signal
DU Distributed Unit
NR New Radio
NW Network
PRACH Physical RACH
PDSCH Physical Downlink Shared Channel
PDU Packet Data Unit
PUSCH Physical Uplink Shared Channel
RA Random Access
RACH Random Access Channel
RAN Radio Access Network
RAR Random Access Response
RAT Radio Access Technology
RNL Radio Network Layer
RNTI Radio Network Temporary Identifier
RRC Radio Resource Control
TC-RNTI Temporary C-RNTI
TNL Transport Network Layer It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device (WD), the network node comprising processing circuitry configured to:

determine an allocation of at least one random access channel (RACH) resource of a plurality of RACH resources to at least one slice or slice group;

identify, from a random access (RA) message received from the WD, whether at least one slice or slice group is associated with the RA message based at least in part on the at least one RACH resource on which the RA message is received; and receive, responsive to a determination of no allocation, a report on the at least one slice or slice group using one of radio resource control (RRC) signaling and medium access control (MAC) signaling, the report being a radio link failure (RLF) report, the RLF report including slice or slice group information associated with the RLF.

2. The network node of claim 1, wherein the processing circuitry is further configured to:

when at least a first RACH resource of the plurality of RACH resources is determined allocated to a first slice of the plurality of slices, cause the network node to receive the RA message from the WD on the allocated at least first RACH resource; and when the at least first RACH resource is determined not allocated to the first slice, cause the network node to receive the RA message from the WD using at least a second RACH resource of the plurality of RACH resources, the at least second RACH resource being shared by the first slice with at least a second slice of the plurality of slices.

3. The network node of claim 2, wherein at least one of:
the at least one slice includes at least one slice group;
the first slice includes the at least a first slice group;
the second slice includes at least a second slice group;
the first slice is associated with a first RA procedure; and
the second slice is associated with a second RA procedure.

4. The network node of claim 1, wherein the RLF is based at least in part on a reference signal associated with the at least one slice of the plurality of slices.

5. The network node of claim 1, wherein the processing circuitry is further configured to, when the RLF is detected on a primary cell link:
cause the network node to receive an indication of slice information associated with the RLF in a reestablishment request message.

6. The network node of claim 1, wherein the processing circuitry is further configured to, when the RLF is detected on a cell group:
cause the network node to receive another indication of slice information associated with the RLF in the cell group, the cell group being one of a master cell group (MCG) and a secondary cell group (SCG).

7. The network node of claim 1, wherein the at least one slice or slice group is included in a plurality of slices or slice groups.

8. The network node of claim 1, wherein the processing circuitry is further configured to cause the network node to transmit a request to the WD to report slice or slice group information responsive to a determination of no allocation of at least one RACH resource to at least one slice or slice group.

9. The network node of claim 1, wherein at least one of:
the slice or slice group information includes at least one of a slice identifier and a slice group identifier; and
the RRC signaling uses an information element (IE) to indicate the slice or slice group information, and the MAC signaling uses a MAC subheader or MAC control element (CE) to indicate the slice or slice group information.

10. A method implemented in a network node configured to communicate with a wireless device (WD), the method comprising:
determining an allocation of at least one random access channel (RACH) resource of a plurality of RACH resources to at least one slice or slice group;
identifying, from a random access (RA) message received from the WD, whether at least one slice or slice group is associated with the RA message based at least in part on the at least one RACH resource on which the RA message is received; and receiving, responsive to determining no allocation, a report on the at least one slice or slice group using one of radio resource control (RRC) signaling and medium access control (MAC) signaling, the report being a radio link failure (RLF) report, the RLF report including slice or slice group information associated with the RLF.

11. The method of claim 10, wherein the method further includes:
when at least a first RACH resource of the plurality of RACH resources is determined allocated to a first slice of the plurality of slices, receiving the RA message from the WD on the allocated at least first RACH resource; and
when the at least first RACH resource is determined not allocated to the first slice, receiving the RA message from the WD using at least a second RACH resource of the plurality of RACH resources, the at least second RACH resource being shared by the first slice with at least a second slice of the plurality of slices.

12. The method of claim 11, wherein at least one of:
the at least one slice includes at least one slice group;
the first slice includes the at least a first slice group;
the second slice includes at least a second slice group;
the first slice is associated with a first RA procedure; and
the second slice is associated with a second RA procedure.

13. The method of claim 10, wherein the RLF is based at least in part on a reference signal associated with the at least one slice of the plurality of slices.

14. The method of claim 10, wherein the method further includes, when the RLF is detected on a primary cell link:
receiving an indication of slice information associated with the RLF in a reestablishment request message.

15. The method of claim 10, wherein the method further includes, when the RLF is detected on a cell group:
receiving another indication of slice information associated with the RLF in the cell group, the cell group being one of a master cell group (MCG) and a secondary cell group (SCG).

16. The method of claim 10, wherein the at least one slice or slice group is included in a plurality of slices or slice groups.

17. The method of claim 10, wherein the method further includes:
transmitting a request to the WD to report slice or slice group information responsive to determining no allocation of at least one RACH resource to at least one slice or slice group.

18. The method of claim 10, wherein at least one of:
the slice or slice group information includes at least one of a slice identifier and a slice group identifier; and
the RRC signaling uses an information element (IE) to indicate the slice or slice group information, and the MAC signaling uses a MAC subheader or MAC control element (CE) to indicate the slice or slice group information.

* * * * *